(12) United States Patent
Lin et al.

(10) Patent No.: US 9,134,738 B2
(45) Date of Patent: Sep. 15, 2015

(54) VOLTAGE CONVERTER

(71) Applicant: Excelliance MOS Corporation, Hsinchu County (TW)

(72) Inventors: Pao-Chuan Lin, Hsinchu County (TW); Li-Chieh Chen, Hsinchu County (TW); Hung-Che Chou, Hsinchu County (TW)

(73) Assignee: Excelliance MOS Corporation, Hsinchu County (TW)

( * ) Notice: Subject to any disclaimer, the term of this patent is extended or adjusted under 35 U.S.C. 154(b) by 174 days.

(21) Appl. No.: 13/762,376

(22) Filed: Feb. 8, 2013

(65) Prior Publication Data

US 2014/0225578 A1  Aug. 14, 2014

(51) Int. Cl.
*H02M 3/156* (2006.01)
*H02M 3/157* (2006.01)
*G05F 1/445* (2006.01)

(52) U.S. Cl.
CPC .................................. *G05F 1/445* (2013.01)

(58) Field of Classification Search
CPC .............................. H02M 3/156; H02M 3/157
USPC ........................... 321/282, 283, 284, 285, 351
See application file for complete search history.

(56) References Cited

U.S. PATENT DOCUMENTS

| | | | |
|---|---|---|---|
| 6,791,306 B2 * | 9/2004 | Walters et al. | 323/288 |
| 7,132,820 B2 * | 11/2006 | Walters et al. | 323/288 |
| 7,482,791 B2 | 1/2009 | Stoichita et al. | |
| 7,482,793 B2 * | 1/2009 | Stoichita | 323/282 |
| 7,511,472 B1 * | 3/2009 | Xia et al. | 324/142 |
| 8,198,880 B2 | 6/2012 | Ouyang | |
| 8,395,368 B2 * | 3/2013 | Ouyang | 323/293 |
| 8,525,505 B2 * | 9/2013 | Wang et al. | 323/286 |
| 8,593,125 B1 * | 11/2013 | Xue | 323/284 |
| 9,013,164 B1 * | 4/2015 | Lee et al. | 323/285 |
| 2008/0088292 A1 * | 4/2008 | Stoichita et al. | 323/285 |
| 2009/0039856 A1 * | 2/2009 | Wang et al. | 323/285 |
| 2009/0146643 A1 * | 6/2009 | Ostrom et al. | 324/123 R |
| 2011/0109290 A1 * | 5/2011 | Tang et al. | 323/282 |
| 2012/0217941 A1 * | 8/2012 | Chen et al. | 323/271 |
| 2013/0208520 A1 * | 8/2013 | Michishita | 363/84 |

\* cited by examiner

*Primary Examiner* — Timothy J Dole
*Assistant Examiner* — Sisay G Tiku
(74) *Attorney, Agent, or Firm* — Jianq Chyun IP Office

(57) ABSTRACT

A voltage converter is disclosed. The voltage converter includes a constant on time signal generator, a first and second transistors, an inductor, a feedback circuit and a ripple injection circuit. The constant on time signal generator generates a first and second driving signals for driving the first and second transistors. The voltage converter generates an output signal at an output end thereof. The feedback circuit divides the output signal to generate a feedback signal at a feedback end of the voltage converter. The ripple injection circuit gets the voltage of the feedback end and the voltage of the phase end to generate a injection signal. The constant on time signal generator generates the first and second driving signals according to the injection signal, the output signal and a reference signal.

8 Claims, 4 Drawing Sheets

VOLTAGE CONVERTER

BACKGROUND OF THE INVENTION

1. Field of the Invention

The present invention generally relates to a voltage converter, in particular, to a buck-type voltage converter capable of generating an output signal having a steady ripple.

2. Description of Related Art

FIG. 1A shows a conventional voltage converter 100. Referring to FIG. 1A, the voltage converter 100 includes a driver 110, a logic operation circuit 120, a comparator CMP1, transistors M1 and M2, an inductor L1, a capacitor C1 and resistors R1 and R2. In the voltage converter 100, the comparator CMP1 compares a reference signal REF with a feedback signal VFB to generate a comparison result, which is processed by the logic operation circuit 120 and the driver 110 in sequence to generate driving signals DRV1 and DRV2. In addition, the transistor M1 receives a power supply voltage VIN.

In the voltage converter 100, when the comparator CMP1 determines through comparison that the feedback signal VFB is lower than the reference signal REF, the transistor M1 is turned on for a period of time according to the driving signal DRV1, and a buck output voltage VOUT is increased correspondingly. Afterward, the transistor M1 is turned off according to the driving signal DRV1 and the transistor M2 is turned on according to the driving signal DRV2, and when the buck output voltage VOUT drops until the feedback signal VFB is once again lower than the reference signal REF, the transistor M1 is turned on for a period of time again according to the driving signal DRV1.

When the equivalent series resistance (ESR) of the capacitor C1 is too low, refer to FIG. 1B, which is a waveform diagram illustrating operation of the voltage converter 100. The ripple component on the feedback signal VFB will become very unobvious, which incurs an unsteady ripple phenomenon on the buck output voltage VOUT, degrading the quality of the buck output voltage VOUT.

SUMMARY OF THE INVENTION

Accordingly, the present invention is directed to a voltage converter capable of effectively generating an output signal having a steady ripple.

The present invention provides a voltage converter, including a constant on time signal generator, a first transistor, a second transistor, an inductor, a feedback circuit and a ripple injection circuit. The constant on time signal generator generates a first driving signal and a second driving signal. The first transistor has a first end for receiving a power supply voltage, a second end coupled to a phase end of the voltage converter, and a control end for receiving the first driving signal. The second transistor has a first end coupled to the phase end, a second end coupled to a reference ground voltage, and a control end for receiving the second driving signal. The inductor is connected in series between the phase end and an output end of the voltage converter, an output signal being generated at the output end of the voltage converter. The feedback circuit divides the output signal to generate a feedback signal at a feedback end of the voltage converter. The ripple injection circuit is coupled to the feedback end and the phase end. The ripple injection circuit senses the voltage of the feedback end and the voltage of the phase end to generate an injection signal. The constant on time signal generator generates the first and the second driving signals according to the injection signal, the output signal and a reference signal.

In an embodiment of the present invention, the ripple injection circuit includes a first resistor, a first capacitor, a second resistor, a second capacitor and an operational amplifier. The first resistor has a first end coupled to the phase end. The first capacitor has a first end coupled to a second end of the first resistor, and a second end coupled to the feedback end. The second resistor has a first end coupled to the second end of the first resistor. The second capacitor has a first end coupled to a second end of the second resistor, and a second end coupled to the feedback end. The operational amplifier has a first input end, a second input end and an output end, the first input end and the second input end being respectively coupled to the first end and the second end of the second resistor. The operational amplifier generates the injection signal according to the voltage of the phase end and the voltage of the feedback end, and transmits the injection signal to the constant on time signal generator through the output end thereof.

In an embodiment of the present invention, the ripple injection circuit further includes a buffer. The buffer is connected in series in the path on which the second capacitor is coupled to the feedback end, and has an input end coupled to the feedback end, and an output end coupled to the second end of the second capacitor.

In an embodiment of the present invention, the ripple injection circuit further includes a voltage division circuit. The voltage division circuit is connected in series in the path on which the first resistor is coupled to the phase end, and used for dividing the voltage at the phase end.

In an embodiment of the present invention, the constant on time signal generator includes an adder and a comparator. The adder performs an add operation on the injection signal and the feedback signal. The comparator is coupled to the adder, and used for comparing an output of the adder with the reference signal to generate a comparison result. The constant on time signal generator generates the first and the second driving signals according to the comparison result.

In an embodiment of the present invention, the constant on time signal generator further includes a logic operation circuit and a driver. The logic operation circuit is coupled to an output end of the comparator. The logic operation circuit receives the comparison result and performs a logic operation on the comparison result. The driver is coupled to the logic operation circuit, and used for receiving a result of the logic operation and generating the first and the second driving signals according to the result of the logic operation.

In an embodiment of the present invention, the voltage converter further includes an output capacitor. The output capacitor has one end coupled to the output end of the voltage converter, and the other end coupled to the reference ground voltage.

In an embodiment of the present invention, the output capacitor is a low ESR capacitor.

In an embodiment of the present invention, the feedback circuit includes a first resistor and a second resistor. The first resistor has one end coupled to the output end of the voltage converter, and the other end coupled to the feedback end. The second resistor has one end coupled to the feedback end, and the other end coupled to the reference ground voltage.

Based on the above, in the present invention, the ripple injection circuit gets the voltage of the feedback end and the voltage of the phase end of the voltage converter to generate the injection signal, and provides the injection signal to the constant on time signal generator. The constant on time signal generator generates the first and the second driving signals according to the injection signal, the output signal and the reference signal. In this way, the output signal generated by the voltage converter has a steady ripple component, thereby improving the quality of the output signal generated by the voltage converter.

In order to make the aforementioned and other objectives and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
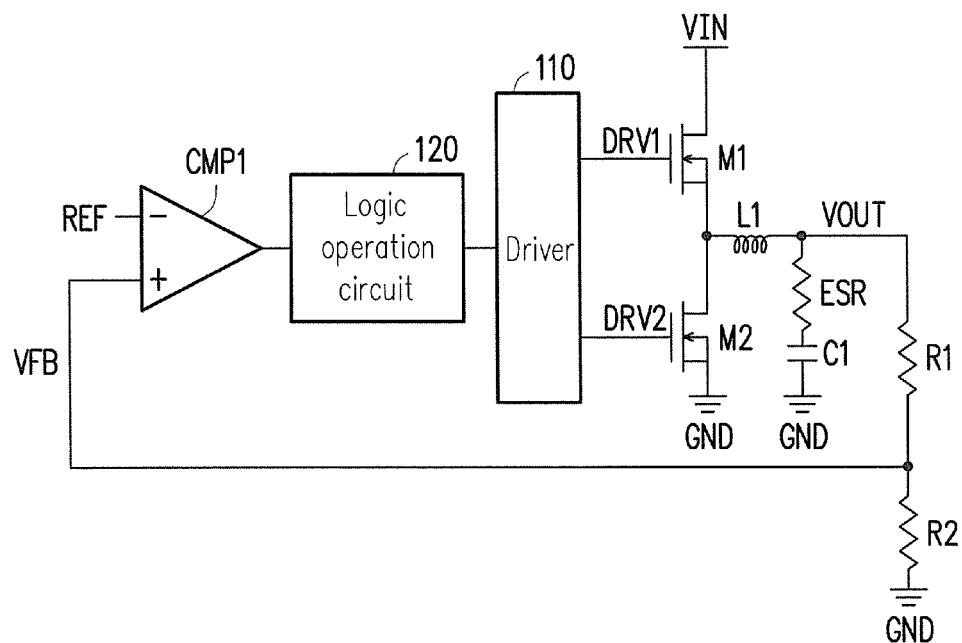
FIG. 1A shows a conventional voltage converter 100.
Figure 1B:
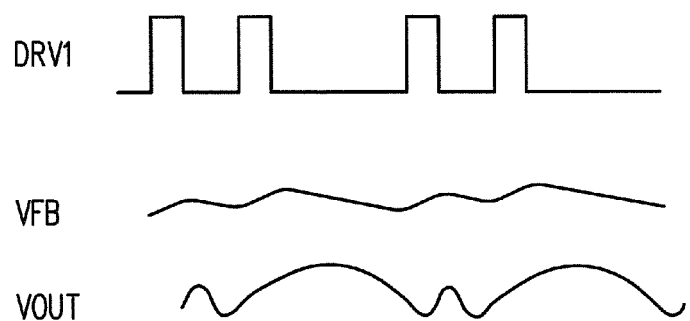
FIG. 1B is a waveform diagram illustrating operation of the voltage converter 100.

Reference will now be made in detail to the present embodiments of the invention, examples of which are illustrated in the accompanying drawings. Wherever possible, the same reference numbers are used in the drawings and the description to refer to the same or like parts.

Figure 2:
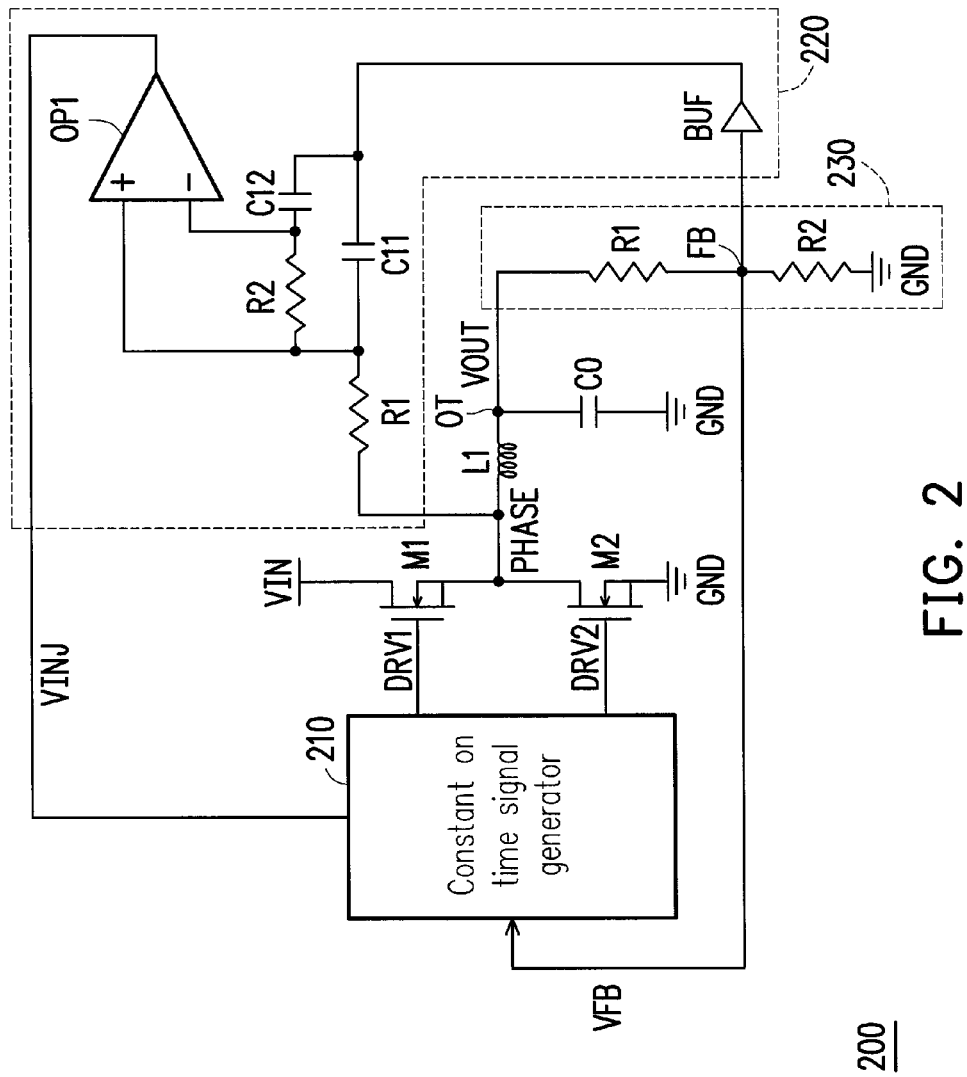
FIG. 2 is a schematic view of a voltage converter 200 according to an embodiment of the present invention.

FIG. 2 is a schematic view of a voltage converter 200 according to an embodiment of the present invention. Referring to FIG. 2, the voltage converter 200 is a buck-type voltage converter. The voltage converter 200 includes a constant on time signal generator 210, transistors M1 and M2, an inductor L1, a ripple injection circuit 220 and a feedback circuit 230. The constant on time signal generator 210 generates driving signals DRV1 and DRV2. The transistor M1 has a first end for receiving a power supply voltage VIN, a second end coupled to a phase end PHASE of the voltage converter 200, and a control end for receiving the driving signal DRV1. Likewise, the transistor M2 has a first end coupled to the phase end PHASE, a second end coupled to a reference ground voltage GND, and a control end for receiving the driving signal DRV2. The transistors M1 and M2 are turned on or off respectively according to the driving signals DRV1 and DRV2. The transistors M1 and M2 will not be turned on at the same time.

The inductor L1 is connected in series between the phase end PHASE and an output end OT of the voltage converter 200. The voltage converter 200 generates an output signal VOUT at the output end OT thereof. The feedback circuit 230 divides the output signal VOUT to generate a feedback signal VFB at a feedback end FB of the voltage converter 200. In this embodiment, the feedback circuit 230 includes resistors R1 and R2. The resistor R1 has a first end coupled to the output end OT and a second end coupled to the feedback end FB; the resistor R2 has a first end coupled to the feedback end FB and a second end coupled to the reference ground voltage GND.

The ripple injection circuit 220 is coupled to the feedback end FB and the phase end PHASE. The ripple injection circuit 220 gets a voltage of the feedback end FB and the voltage of the phase end PHASE, and provides an injection signal VINJ to the constant on time signal generator 210 according to the voltage of the feedback end FB and the voltage of the phase end PHASE.

In this embodiment, the ripple injection circuit 220 includes resistors R1 and R2, capacitors C11 and C12, an operational amplifier OP1 and a buffer BUF. The resistor R1 has a first end coupled to the phase end PHASE and a second end coupled to a first end of the capacitor C11 and a first end of the resistor R2. A second end of the capacitor C11 is coupled to an output end of the buffer BUF. A second end of the resistor R2 is coupled to a first end of the capacitor C12, and a second end of the capacitor C12 is coupled to the output end of the buffer BUF. Two input ends of the operational amplifier OP1 are respectively coupled to the second end of the resistor R1 and the second end of the resistor R2. An output end of the operational amplifier OP1 generates the injection signal VINJ, and transmits the injection signal VINJ to the constant on time signal generator 210.

In addition, an input end of the buffer BUF is coupled to the feedback end FB. The buffer BUF may be a unit gain buffer.

The operational amplifier OP1 generates the injection signal VINJ according to the voltage detected by the resistors R1 and R2 and the capacitors C11 and C12. The resistance of the resistors R1 and R2 and the capacitance of the capacitors C11 and C12 may be set according to the frequency of the output signal VOUT.

The voltage converter 200 further includes an output capacitor CO. The output capacitor CO has one end coupled to the output end OT of the voltage converter 200, and the other end coupled to the reference ground voltage GND. The output capacitor CO may be a low ESR capacitor.

Figure 3:
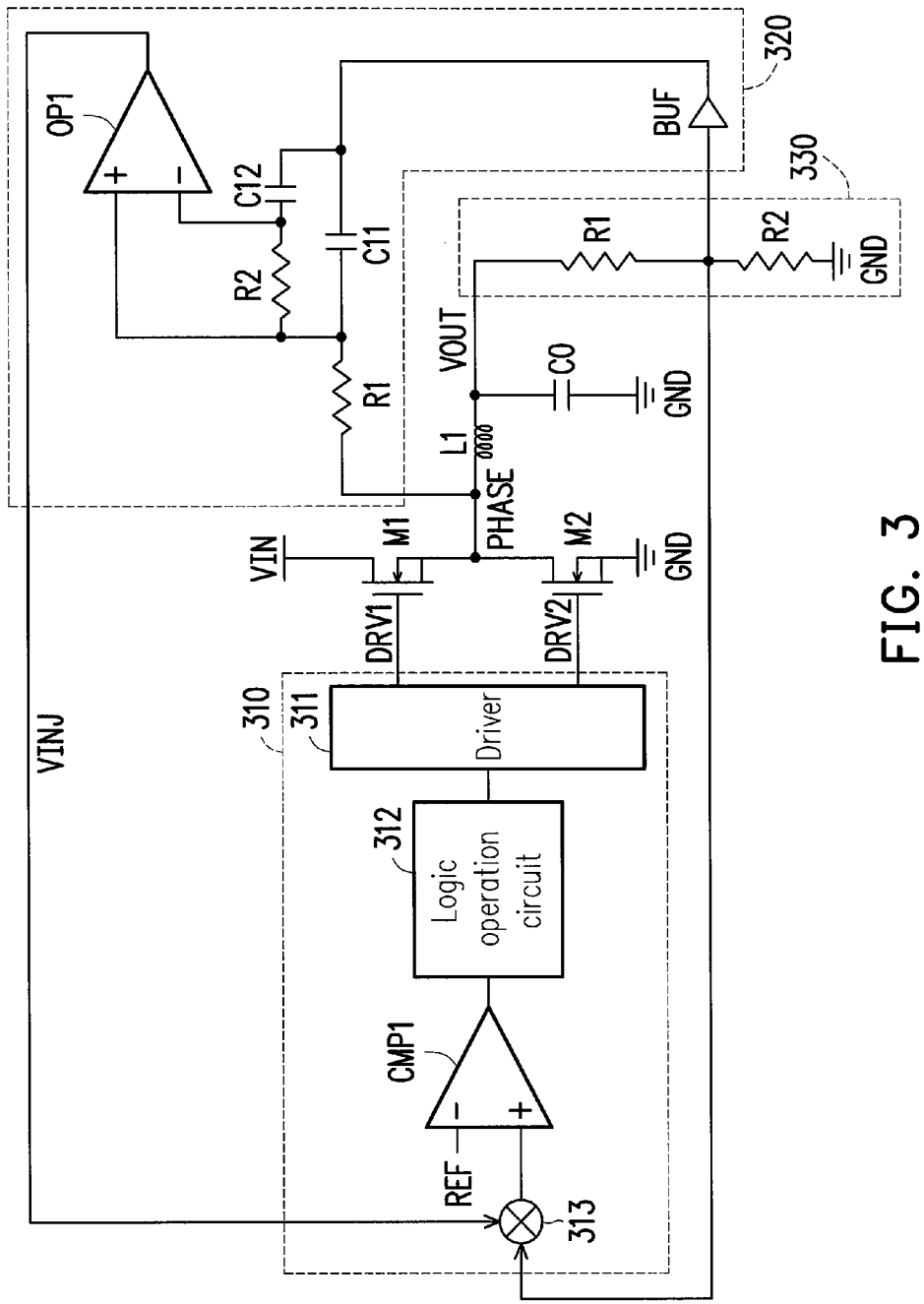
FIG. 3 is a schematic view of a voltage converter 300 according to another embodiment of the present invention.

FIG. 3 is a schematic view of a voltage converter 300 according to another embodiment of the present invention. Referring to FIG. 3, the voltage converter 300 includes a constant on time signal generator 310, transistors M1 and M2, an inductor L1, a ripple injection circuit 320 and a feedback circuit 330. In this embodiment, the ripple injection circuit 320 and the feedback circuit 330 respectively have the same circuit structure as the ripple injection circuit 220 and the feedback circuit 230 in the previous embodiment, so that the details will not be described herein again. It should be noted that, in this embodiment, a pulse width modulated (PWM) signal generator 310 includes a driver 311, a logic operation circuit 312, an adder 312 and a comparator CMP1. The logic operation circuit 312 is coupled to an output end of the comparator CMP1, and receives a comparison result generated by the comparator CMP1 and performs a logic operation on the comparison result. The driver 311 is coupled to the logic operation circuit 312. The driver 311 receives a result of the logic operation performed by the logic operation circuit 312 and generates driving signals DRV1 and DRV2 according to the result of the logic operation. The adder 313 is used for performing an add operation on the injection signal VINJ generated by the ripple injection circuit 320 and the feedback signal VFB. The comparator CMP1 is coupled to the adder 313, and compares an output from the adder after performing the add operation with a reference signal REF to generate the comparison result.

Furthermore, the reference signal REF is a preset signal, and may be set by a designer according to the actual operating state of the voltage converter 300.

Figure 4:
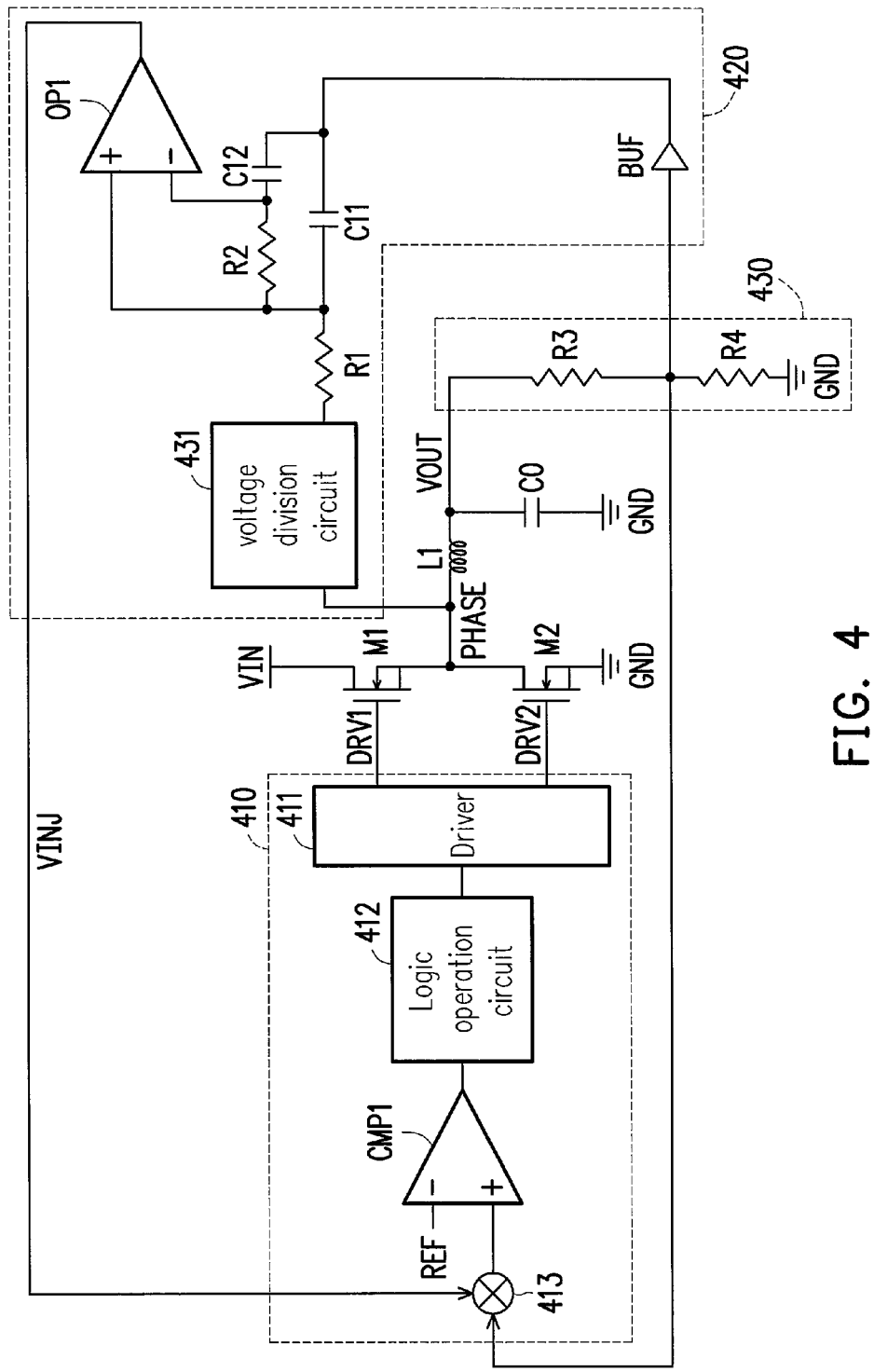
FIG. 4 is a schematic view of a voltage converter 400 according to still another embodiment of the present invention.

FIG. 4 is a schematic view of a voltage converter 400 according to still another embodiment of the present invention. Referring to FIG. 4, the voltage converter 400 includes a constant on time signal generator 410, transistors M1 and M2, an inductor L1, a ripple injection circuit 420 and a feedback circuit 430. Different from the previous embodiment, the ripple injection circuit 420 of the voltage converter 400 further includes a voltage division circuit 431. The voltage division circuit 431 is connected in series in the path on which the resistor R1 is coupled to the phase end PHASE, and used for dividing the voltage at the phase end PHASE. That is to say, the voltage division circuit 431 may divide the voltage at the phase end PHASE first, and then provide the divided voltage at the phase end PHASE to a voltage detecting circuit, which is formed by the resistors R1 and R2, the capacitors C11 and C12 and the operational amplifier OP1 and used for voltage detection.

Furthermore, the feedback end VFB and the phase end PHASE described in the above embodiments may be pins on the voltage converter after the voltage converter is fabricated into a chip. That is to say, when the ripple injection circuit is connected to existing pins on the voltage converter chip, the output signal generated by the voltage converter can have a steady ripple, thereby improving the quality of the output signal.

Based on the above, in the present invention, the voltage of the feedback end and the voltage of the phase end is used as a basis for generating the injection signal, and the sum of the feedback signal and the injection signal is compared with the reference signal to generate the driving signals for controlling on or off of the transistors. In this way, the output signal generated by the voltage converter can have a steady ripple component.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A voltage converter, comprising:
   a constant on time signal generator, for generating a first driving signal and a second driving signal;
   a first transistor, comprising a first end for receiving a power supply voltage, a second end coupled to a phase end of the voltage converter, and a control end for receiving the first driving signal;
   a second transistor, comprising a first end coupled to the phase end, a second end coupled to a reference ground voltage, and a control end for receiving the second driving signal;
   an inductor, connected in series between the phase end and an output end of the voltage converter, an output signal being generated at the output end of the voltage converter;
   a feedback circuit, for dividing the output signal to generate a feedback signal at a feedback end of the voltage converter; and
   a ripple injection circuit, coupled to the feedback end and the phase end, and for getting a voltage of the feedback end and a voltage of the phase end to generate a injection signal according to a voltage difference between the voltage of the feedback end and the voltage of the phase end;
   wherein the constant on time signal generator generates the first and the second driving signals according to the injection signal, the output signal and a reference signal,
   wherein the ripple injection circuit comprises:
      a first resistor, comprising a first end coupled to the phase end;
      a first capacitor, comprising a first end coupled to a second end of the first resistor, and a second end receiving the feedback signal;
      a second resistor, comprising a first end coupled to the second end of the first resistor;
      a second capacitor, comprising a first end coupled to a second end of the second resistor, and a second end receiving the feedback signal; and
      an operational amplifier, comprising a first input end, a second input end and an output end, the first input end and the second input end being respectively coupled to the first end and the second end of the second resistor, wherein the operational amplifier generates an injection signal according to the voltage difference, and transmits the injection signal to the constant on time signal generator through the output end thereof.

2. The voltage converter according to claim 1, wherein the ripple injection circuit further comprises:
   a voltage division circuit, connected in series in the path on which the first resistor is coupled to the phase end, and for dividing the voltage at the phase end.

3. The voltage converter according to claim 1, wherein the ripple injection circuit further comprises:
   a buffer, connected in series in the path on which the second capacitor is coupled to the feedback end, and comprising an input end coupled to the feedback end, and an output end coupled to the second end of the second capacitor.

4. The voltage converter according to claim 1, wherein the constant on time signal generator comprises:
   an adder, for performing an add operation on the injection signal and the feedback signal; and
   a comparator, coupled to the adder, and for comparing an output of the adder with the reference signal to generate a comparison result,
   wherein the constant on time signal generator generates the first and the second driving signals according to the comparison result.

5. The voltage converter according to claim 4, wherein the constant on time signal generator further comprises:
   a logic operation circuit, coupled to an output end of the comparator, and for receiving the comparison result and performing a logic operation on the comparison result; and
   a driver, coupled to the logic operation circuit, and for receiving a result of the logic operation and generating the first and the second driving signals according to the result of the logic operation.

6. The voltage converter according to claim 1, further comprising:
   an output capacitor, comprising one end coupled to the output end of the voltage converter, and the other end coupled to the reference ground voltage.

7. The voltage converter according to claim 6, wherein the output capacitor is a low equivalent series resistance (ESR) capacitor.

8. The voltage converter according to claim 1, wherein the feedback circuit comprises:
   a first resistor, comprising one end coupled to the output end of the voltage converter, and the other end coupled to the feedback end; and
   a second resistor, comprising one end coupled to the feedback end, and the other end coupled to the reference ground voltage.

* * * * *